(12) United States Patent
Yokoo et al.

(10) Patent No.: US 9,912,268 B2
(45) Date of Patent: Mar. 6, 2018

(54) SENSOR-LESS CIRCUIT AND METHOD FOR DETECTING A ROTOR POSITION

(71) Applicant: Semiconductor Components Industries, LLC, Phoenix, AZ (US)

(72) Inventors: Satoshi Yokoo, Ota (JP); Atsuhiro Ichikawa, Ibigun Oono-cyou (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 298 days.

(21) Appl. No.: 14/838,782

(22) Filed: Aug. 28, 2015

(65) Prior Publication Data

US 2016/0320208 A1 Nov. 3, 2016

Related U.S. Application Data

(60) Provisional application No. 62/154,744, filed on Apr. 30, 2015.

(51) Int. Cl.
| | |
|---|---|
| *H02P 6/18* | (2016.01) |
| *H02P 6/182* | (2016.01) |
| *G01D 5/20* | (2006.01) |

(52) U.S. Cl.
CPC ............. *H02P 6/182* (2013.01); *H02P 6/187* (2013.01); *G01D 5/2046* (2013.01)

(58) Field of Classification Search
CPC ...................................................... H02P 6/182
USPC .......................................... 318/700, 400.01
See application file for complete search history.

(56) References Cited

U.S. PATENT DOCUMENTS

| | | | |
|---|---|---|---|
| 4,712,050 A | 12/1987 | Nagasawa et al. | |
| 5,783,917 A * | 7/1998 | Takekawa | ............... H02P 6/182 318/400.1 |
| 5,912,552 A | 6/1999 | Tateishi | |
| 6,777,932 B2 | 8/2004 | Hara et al. | |
| 8,773,052 B2 * | 7/2014 | Clothier | .................... H02P 6/14 318/400.01 |
| 9,088,235 B2 * | 7/2015 | Bateman | ................... H02P 6/18 |
| 9,121,753 B2 | 9/2015 | Cahill et al. | |
| 2008/0197834 A1 | 8/2008 | Takeda | |

(Continued)

FOREIGN PATENT DOCUMENTS

| | | |
|---|---|---|
| JP | 08140392 | 5/1996 |
| JP | 2011-120421 | 6/2011 |
| JP | 2012-080690 | 4/2012 |

*Primary Examiner* — David S Luo
(74) *Attorney, Agent, or Firm* — Rennie William Dover

(57) ABSTRACT

In accordance with an embodiment, a sensor-less detection circuit is provided that includes a first voltage adjustment circuit coupled for receiving an induced voltage and a second voltage adjustment circuit coupled for receiving a common voltage. A differential amplifier has an inverting input terminal coupled to the first voltage adjustment circuit and a noninverting input terminal coupled to the second voltage adjustment circuit. In accordance with another embodiment, a method for detecting a motor rotor position is provided that includes receiving a first back electromotive force that is at a first voltage level and shifting the first back electromotive force from the first voltage level to a second voltage level. The first back electromotive force is filtered to generate a first filtered voltage; and a first motor rotor position signal is generated in response to comparing the first filtered voltage with a reference voltage.

19 Claims, 4 Drawing Sheets

(56) References Cited

U.S. PATENT DOCUMENTS

| | | |
|---|---|---|
| 2008/0218107 A1 | 9/2008 | Otaguro |
| 2014/0117889 A1 | 5/2014 | Fujimura et al. |
| 2014/0159624 A1 | 6/2014 | Ko |
| 2016/0322963 A1 | 11/2016 | Yokoo et al. |

* cited by examiner

SENSOR-LESS CIRCUIT AND METHOD FOR DETECTING A ROTOR POSITION

BACKGROUND

The present invention relates, in general, to electronics and, more particularly, to a brushless DC motor.

Brushless Direct Current (BLDC) motors are used in a variety of applications including actuators used in automotive circuits, disc drives, compact disc players, digital video disc players, scanners, printers, plotters, the aviation industry, etc. Typically, multiple phase motors include a stationary portion or stator that produces a rotating magnetic field and a non-stationary portion or rotor in which torque is created by the rotating magnetic field. The torque causes the rotor to rotate which in turn causes a shaft connected to the rotor to rotate. At start-up it is desirable to detect the position and rotation rate of the brushless DC motor's rotor. In a brushless DC motor having sensors, the rotor position and its rotation rate may be detected and controlled using Hall sensors. However, the accuracy of Hall sensors is influenced by their operating environment, which decreases the accuracy of the measurements they provide. In sensorless brushless DC motors, the position of the rotor is detected using a Back ElectroMotive Force (BEMF) signal. Typically, the BEMF signal is compared with a voltage generated by a high voltage PNP circuit element that consumes large areas of a semiconductor substrate. Because the high voltage PNP circuit element occupies a large area of the semiconductor substrate, miniaturization using monolithic integrated circuit processes is limited. In addition, the comparison is limited to positive voltages and the comparison becomes inaccurate when the rotor is moving slowly or not at all because the BEMF signal becomes very small. These limitations become even more problematic in automotive applications because of the external interruptions such as, for example, noise which occurs in an automotive environment.

Accordingly, it would be advantageous to have a method and structure for detecting a rotor position that accommodates a high input voltage range and has a high noise immunity. It is desirable for the method and structure to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1A:
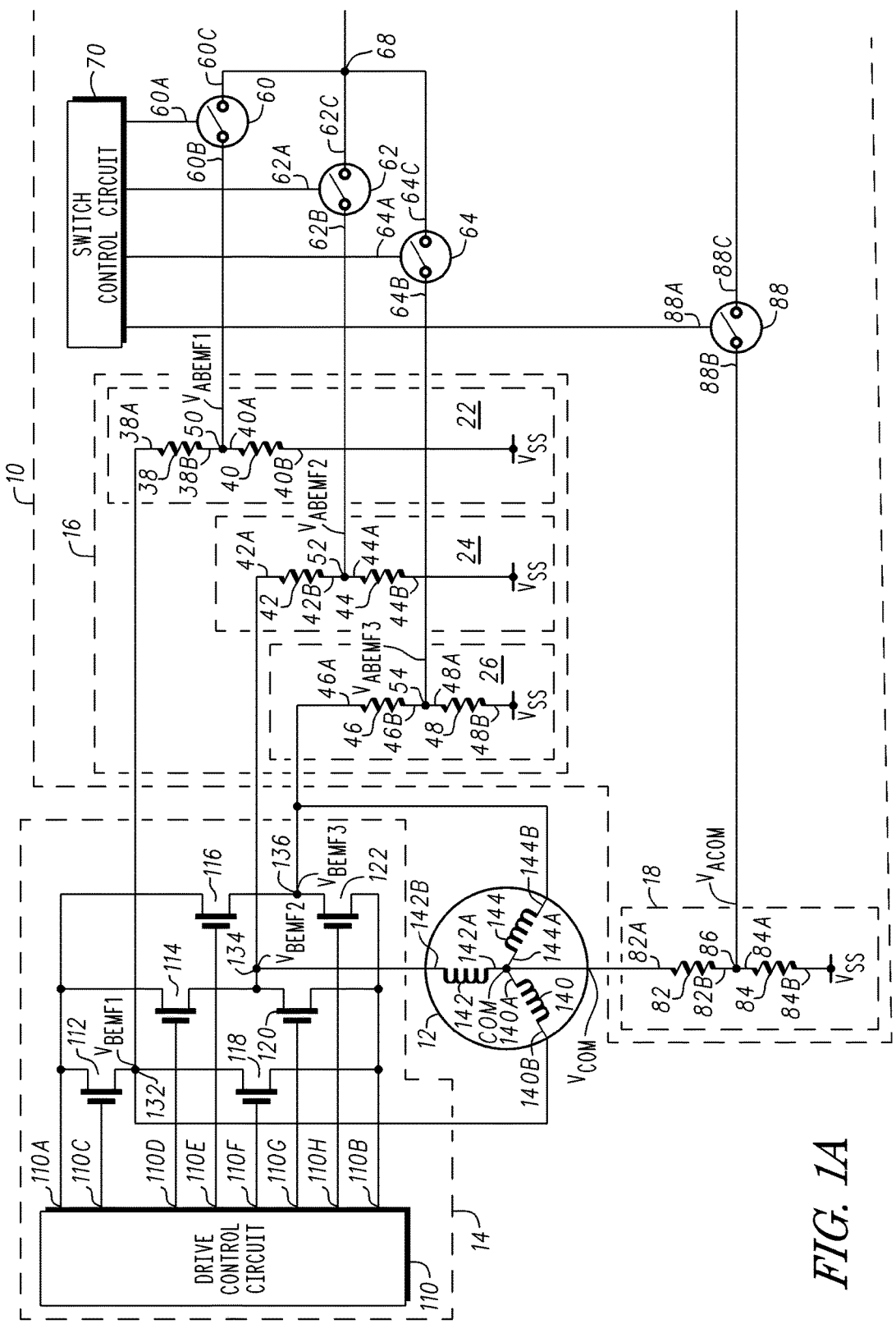
FIG. 1A is a portion of a circuit schematic of a sensor-less detection circuit coupled to a Brushless Direct Current (BLDC) motor and to a motor drive circuit in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It should be noted that a doped region may be referred to as a dopant region. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

DETAILED DESCRIPTION

Generally, embodiments of the present invention include a sensor-less circuit configured to detect a position of a motor rotor and a method for detecting the position of the motor rotor. In accordance with an embodiment, the sensor-less detection circuit comprises a first voltage adjustment circuit, a second voltage adjustment circuit, a differential amplifier, and a comparator. The first voltage adjustment circuit has a first terminal and a second terminal, wherein the first terminal of the first voltage adjustment circuit is coupled for receiving a first induced voltage, a second induced voltage, or a third induced voltage. The second voltage adjustment circuit has a first terminal and a second terminal, the first terminal coupled for receiving a common voltage. The differential amplifier has an inverting input terminal, a noninverting input terminal, and an output terminal, wherein the inverting input terminal of the differential amplifier is connected to the second terminal of the first voltage adjustment circuit and the noninverting input terminal of the differential amplifier is connected to the second terminal of the second voltage adjustment circuit. The comparator has a first input terminal, a second input terminal, and an output terminal, wherein the first input terminal of the comparator is connected to the output terminal of the differential amplifier.

In accordance with another embodiment, a sensor-less circuit is configured to detect a position of a motor rotor and comprises an active filter, a first level shifting circuit, a second level shifting circuit, and a determination circuit. The active filter has a differential input and an output, wherein the differential input includes an inverting input terminal and a noninverting input terminal. The first level shifting circuit has a first terminal and a second terminal, wherein the first terminal is coupled for receiving a first back electromotive force and the second terminal is switchably connected to the inverting input terminal of the active filter. The second level shifting circuit has a first terminal and a second terminal, wherein the first terminal is connected for receiving a common voltage and the second reference terminal is switchably connected to the noninverting input terminal of the active filter. The determination circuit has a first input terminal, a second input terminal, and an output terminal, wherein the first input terminal is connected to the output of the active filter.

In accordance with another embodiment, a method for detecting a motor rotor position is provided that comprises receiving a first back electromotive force at a first voltage level and shifting the first back electromotive force from the first voltage level to a second voltage level. The first back electromotive force at the second voltage level is filtered to generate a first filtered voltage. A first motor rotor position signal is generated in response to comparing the first filtered voltage with a reference voltage.

In accordance with an aspect, a second back electromotive force a second back electromotive force at a third voltage level is received and level shifted from the third voltage level to a fourth voltage level. The second back electromotive force at the fourth voltage level is filtered to generate a second filtered voltage. A second motor rotor position signal is generated in response to comparing the second filtered voltage with the reference voltage. A third back electromotive force at a fifth level is received and shifted to a sixth voltage level and filtered to generate a third filtered voltage. A third motor rotor position signal is generated in response to comparing the third filtered voltage with the reference voltage. In accordance with an embodiment, the second voltage level is less than the first voltage level, the fourth voltage level is less than the third voltage level, and the sixth voltage level is less than the fifth voltage level.

In accordance with another aspect, filtering the first back electromotive force at the second voltage level to generate the first filtered voltage includes switchably coupling the first back electromotive force at the second voltage level to an active low pass filter and filtering the second back electromotive force at the fourth voltage level to generate the second filtered voltage includes switchably coupling the second back electromotive force at the fourth level to the active low pass filter, and filtering the third back electromotive force at the sixth voltage level to generate the third filtered voltage includes switchably coupling the third back electromotive force at the sixth level to the active low pass filter.

Figure 1B:
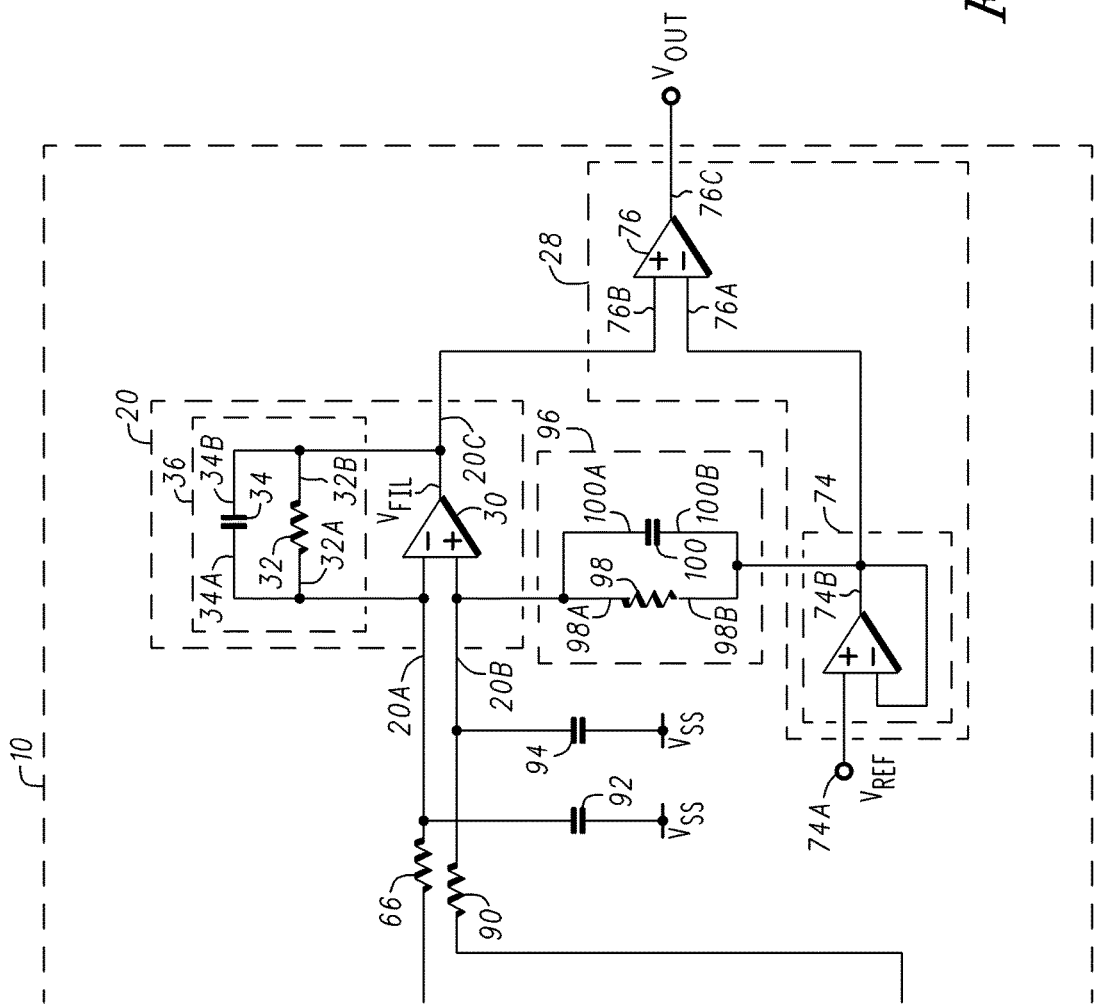
FIG. 1B is another portion of a circuit schematic of a sensor-less detection circuit coupled to a Brushless Direct Current (BLDC) motor and to a motor drive circuit.

FIGS. 1A and 1B illustrate a circuit schematic of a sensor-less detection circuit 10 coupled to a Brushless Direct Current (BLDC) motor 12 and to a motor drive circuit 14. For the sake of clarity, sensor-less detection circuit 10 has been broken into two sheets of drawings and labelled FIGS. 1A and 1B. Sensor-less detection circuit 10 is comprised of an active filter 20 having an input 20A switchably coupled to a level shifting circuit 16, an input 20B switchably coupled to a level shifting circuit 18, and an output coupled to a determination circuit 28. Level shifting circuits 16 and 18 may be referred to voltage adjustment circuits in embodiments in which a voltage level is shifted. More particularly, active filter 20 includes an amplifier 30, a resistor 32, and a capacitor 34, and has an input 20A, an input 20B, and an output 20C. Resistor 32 has a terminal 32A connected to input 20A of active filter 20 and a terminal 32B connected to output 20C of active filter 20 and capacitor 34 has a terminal 34A connected to input 20A of active filter 20 and a terminal 34B connected to output 20C of active filter 20. Resistor 32 and capacitor 34 are configured to form a low pass filter 36. Filter 20 is referred to as an active filter because it is comprised of operational amplifier 30 and low pass filter 36, which low pass filter 36 is comprised of resistor 32 and capacitor 34.

In accordance with an embodiment, level shifting circuit 16 includes voltage divider networks 22, 24, and 26. Voltage divider network 22 is comprised of a resistor 38 connected to a resistor 40, voltage divider network 24 is comprised of a resistor 42 connected to a resistor 44, and voltage divider network 26 is comprised of a resistor 46 and a resistor 48. Resistor 38 has a terminal 38A coupled for receiving a back electromotive force voltage $V_{BEMF1}$ and a terminal 38B connected to a terminal 40A of resistor 40 to form a node 50. Resistor 42 has a terminal 42A coupled for receiving a back electromotive force voltage $V_{BEMF2}$ and a terminal 42B connected to a terminal 44A of resistor 44 to form a node 52. Resistor 46 has a terminal 46A coupled for receiving a back electromotive force voltage $V_{BEMF3}$ and a terminal 46B connected to a terminal 48A of resistor 48 to form a node 54. Resistor 40 has a terminal 40B coupled for receiving a source of operating potential $V_{SS}$, resistor 44 has a terminal 44B coupled for receiving source of operating potential $V_{SS}$, and resistor 48 has a terminal 48B coupled for receiving source of operating potential $V_{SS}$. By way of example, operating potential $V_{SS}$ is a ground potential.

Level shifting circuit 16 is connected to input 20A of active filter 20 through switches 60, 62, and 64 and to an impedance element 66. By way of example, impedance element 66 is a resistor. In accordance with an embodiment, level shifting circuit 16 is comprised of voltage divider networks 22, 24, and 26 having nodes 50, 52, and 54, respectively. Node 50 is connected to input 20A of active filter 20 through switch 60 and impedance element 66; node 52 is connected to input 20A of active filter 20 through switch 62 and impedance element 66; and node 54 is connected to input 20A of active filter 20 through switch 64 and impedance element 66. Switch 60 has a control terminal 60A coupled for receiving a control signal from a switch control circuit 70, a conduction terminal 60B connected to node 50 of voltage divider network 22, and a conduction terminal 60C connected to a node 68, which node 68 is connected to input 20A of active filter 20 through resistor 66. Switch 62 has a control terminal 62A coupled for receiving a control signal from switch control circuit 70, a conduction terminal 62B connected to node 52 of voltage divider network 24, and a conduction terminal 62C connected to node 68, which node 68 is connected to input 20A of active filter 20. Switch 64 has a control terminal 64A coupled for receiving a control signal from switch control circuit 70, a conduction terminal 64B connected to node 54 of voltage divider network 26, and a conduction terminal 64C connected to node 68, which node 68 is connected to input 20A of active filter 20.

Level shifting circuit 18 may include a voltage divider network that is comprised of a resistor 82 connected to a resistor 84. Resistor 82 has a terminal 82A coupled for receiving a common voltage $V_{COM}$ from BLDC motor 12, and a terminal 82B connected to a terminal 84A of resistor 84 to form a node 86. Resistor 84 has a terminal 84B coupled for receiving source of operating potential $V_{SS}$. Node 86 of level shifting circuit 18 is connected to input 20B of active filter 20 through switch 88 and an impedance element 90. More particularly, switch 88 has a control terminal 88A coupled for receiving a control signal from switch control circuit 70, a conduction terminal 88B connected to node 86 of level shifting circuit 18, and a conduction terminal 88C connected to input 20B of active filter 20. By way of example, impedance element 90 is a resistor.

In accordance with an embodiment, determination circuit 28 is comprised of a voltage follower circuit 74 connected to a comparator 76. Voltage follower circuit 74 has an input 74A coupled for receiving a reference voltage $V_{REF}$ and an output 74B connected to an input 76A of comparator 76. Voltage follower circuit 74 may be comprised of an amplifier having a noninverting input terminal which serves as input 74A, an inverting input terminal, and an output terminal, wherein the inverting input terminal and the output terminal of the amplifier are electrically connected together. Output 20C of active filter 20 is connected to an input 76B of comparator 76.

A capacitor 92 is connected between input 20A of active filter 20 and source of operating potential $V_{SS}$, a capacitor 94 is connected between input 20B of active filter 20 and source of operating potential $V_{SS}$, and a resistor-capacitor network 96 is connected between input 20B of active filter 20 and source of operating potential $V_{SS}$. Resistor 66 and capacitor 92 form a low pass filter and resistor 90 and capacitor 94 form a low pass filter. Resistor-capacitor network 96 is comprised of a resistor 98 and a capacitor 100. Resistor 98 has terminals 98A and 98B and capacitor 100 has terminals 100A and 100B, wherein terminals 98A and 100A are commonly connected together and to input 20B of active filter 20, and terminals 98B and 100B are commonly connected together and to output 74B of voltage follower 74. Resistor-capacitor network 96 is not limited to being a network comprising a single resistor and a single capacitor. Resistor-capacitor network 96 may be comprised of a plurality of resistors and a plurality of capacitors, a single resistor and a plurality of capacitors, a single capacitor and a plurality of resistors or the like to form a low pass filter. In accordance with an embodiment, resistors 32, 66, and 90 have the same resistance value and capacitors 34, 92, and 94 have the same resistance value. The low pass filter comprising resistor 66 and capacitor 92, the low pass filter comprising resistor 90 and capacitor 94, and the low pass filter comprising resistor 98 and capacitor 100 reduce interference caused by, for example, high frequency signals present on the input signal that may degrade the operation of sensorless detection circuit 10. Setting resistors 32, 66, and 90 to have the same resistance value and capacitors 34, 92, and 94 to have the same capacitance value helps to further reduce the effects of high frequencies on the input signal, especially in automotive applications.

It should be noted that capacitors 34, 92, 94, and 100 are optional circuit elements.

Motor drive circuit 14 includes a drive control circuit 110 coupled to drive transistors 112, 114, 116, 118, 120, and 122, where drive control circuit 110 is configured for driving transistors 112-122. Each of drive transistors 112-122 has a drain, a source, and a gate. The drains of transistors 112, 114, and 116 are commonly connected together and to a terminal 110A of drive control circuit 110 and the sources of transistors 118, 120, and 122 are commonly connected together and to a terminal 110B of drive control circuit 110. The source of transistor 112 is connected to the drain of transistor 118 and to terminal 38A of resistor 38 to form a node 132. A back electromotive force $V_{BEMF1}$ is generated at node 132. The source of transistor 114 is connected to the drain of transistor 120 and to terminal 42A of resistor 42 to form a node 134. A back electromotive force $V_{BEMF2}$ is generated at node 134. The source of transistor 116 is connected to the drain of transistor 122 and to terminal 46A of resistor 46 to form a node 136. A back electromotive force $V_{BEMF3}$ is generated at node 136. The gate of transistor 112 is connected to a terminal 110C of drive control circuit 110; the gate of transistor 114 is connected to a terminal 110D of drive control circuit 110; the gate of transistor 116 is connected to a terminal 110E of drive control circuit 110; the gate of transistor 118 is connected to a terminal 110F of drive control circuit 110; the gate of transistor 120 is connected to a terminal 110G of drive control circuit 110; and the gate of transistor 122 is connected to a terminal 110H of drive control circuit 110.

BLDC motor 12 includes inductive elements 140, 142, and 144. Inductive element 140 has a terminal 140A commonly connected to terminals 142A and 144A of inductive elements 142 and 144, respectively, to form a common node COM. Inductive element 140 has a terminal 140B connected to node 132, inductive element 142 has a terminal 142B connected to node 134, and inductive element 144 has a terminal 144B connected to node 136. A common voltage $V_{COM}$ is generated at node COM.

In operation, drive control circuit 110 generates drive control signals at output terminals 110A, 110B, 110C, 110D, 110E, 110F, 110G, and 110H. More particularly, drive control circuit 110 generates a bias voltage at output terminal 110A and a bias voltage at output terminal 110B. The bias voltage generated at output terminal 110B may be reference to a voltage $V_{SS}$. By way of example, bias voltage $V_{SS}$ is ground. Drive control circuit 110 further generates gate voltages that appear at the gates of transistors 112-122. For example, drive control circuit 110 generates a gate voltage for transistor 112 at output terminal 110C, a gate voltage for transistor 114 at output terminal 110D, a gate voltage for transistor 116 at output terminal 110E, a gate voltage for transistor 118 at output terminal 110F, a gate voltage for transistor 120 at output terminal 110G, and a gate voltage for transistor 122 at output terminal 110H. In response to the drive signals at output terminals 110A-110H, BEMF signals $V_{BEMF1}$, $V_{BEMF2}$, and $V_{BEMF3}$ are generated at nodes 132, 134, and 136, respectively. In addition, a common voltage $V_{COM}$ is generated at a common node COM.

In a phase commonly referred to as a U-phase, a BEMF signal $V_{BEMF1}$ appears at node 132, whereas BEMF signals $V_{BEMF2}$ and $V_{BEMF3}$ are absent from nodes 134 and 136, respectively. BEMF signal $V_{BEMF1}$ is level shifted or voltage adjusted to a lower voltage by voltage divider circuit 22 so that a shifted or adjusted voltage $V_{ABEMF1}$ is generated at node 50 and appears at conduction terminal 60B of switch 60. Switch control circuit 70 generates control signals that close switch 60 and open switches 62 and 64. More particularly, switch control circuit 70 generates a control signal at control terminal 60A to close switch 60, a control signal at control terminal 62A to open switch 62, and a control signal at control terminal 64A to open switch 64. In response to switch 60 being closed, adjusted voltage $V_{ABEMF1}$ appearing at conduction terminal 60B is transmitted to conduction terminal 60C and to inverting input 20A of active filter 20.

Common voltage $V_{COM}$ appearing at node COM is level shifted or voltage adjusted to a lower voltage by voltage divider circuit 18 so that a shifted or adjusted voltage $V_{ACOM}$ is generated at node 86 and appears at conduction terminal 88B of switch 88. Switch control circuit 70 generates a control signal that closes switch 88. In response to switch 88 being closed, adjusted voltage $V_{ACOM}$ appearing at conduction terminal 88B is transmitted to conduction terminal 88C and to noninverting input 20B of active filter 20.

Thus, voltage divider circuit 22 lowers or shifts BEMF voltage $V_{BEMF1}$ to a level, i.e., $V_{ABEMF1}$, compatible with the input voltage levels of active filter 20. Likewise, voltage divider circuit 18 lowers or shifts voltage $V_{COM}$ to a voltage level, i.e., $V_{ACOM}$, compatible with the input voltage level range of active filter 20. Voltage divider circuits 18 and 22 are configured to shift the voltage levels of BEMF voltage $V_{BEMF1}$ and can shift voltages from a negative voltage to a positive voltage level and differential amplifier 30 can output a filtered voltage $V_{FIL}$ indicative of the back electromotive force. In response to signals $V_{ABEMF1}$ and $V_{ACOM}$ at inputs 20A and 20B, respectively, active filter 20 generates an output voltage $V_{FIL}$ at output terminal 20C, which is transmitted to the noninverting input of comparator 76.

Comparator 76 compares output voltage $V_{FIL}$ with a reference voltage $V_{REF}$ to generate an output signal $V_{OUT}$ indicative of the motor rotor position. It should be noted that comparator 76 may serve as a zero-cross detection circuit that determines the zero-crossing value of BEMF signal $V_{BEMF1}$.

In a phase commonly referred to as a V-phase, a BEMF signal $V_{BEMF2}$ appears at node 134, whereas BEMF signals $V_{BEMF1}$ and $V_{BEMF3}$ are absent from nodes 132 and 136, respectively. BEMF signal $V_{BEMF2}$ is level shifted or voltage adjusted to a lower voltage by voltage divider circuit 24 so that a shifted or adjusted voltage $V_{ABEMF2}$ is generated at node 52 and appears at conduction terminal 62B of switch 62. Switch control circuit 70 generates a control signal that closes switch 62 and control signals that open switches 60 and 64. More particularly, switch control circuit 70 generates a control signal at control terminal 62A to close switch 62, a control signal at control terminal 60A to open switch 60, and a control signal at control terminal 64A to open switch 64. In response to switch 62 being closed, adjusted voltage $V_{ABEMF2}$ appearing at conduction terminal 62B is transmitted to conduction terminal 62C and to inverting input 20A of active filter 20.

Common voltage $V_{COM}$ appearing at node COM is level shifted or voltage adjusted to a lower voltage by voltage divider circuit 18 so that a shifted or adjusted voltage $V_{ACOM}$ is generated at node 86 and appears at conduction terminal 88B of switch 88. Switch control circuit 70 generates a control signal that closes switch 88. In response to switch 88 being closed, adjusted voltage $V_{ACOM}$ appearing at conduction terminal 88B is transmitted to conduction terminal 88C and to noninverting input 20B of active filter 20.

Thus, voltage divider circuit 24 lowers or shifts BEMF voltage $V_{BEMF2}$ to a level, i.e., $V_{ABEMF2}$, compatible with active filter 20. Likewise, voltage divider circuit 18 lowers or shifts voltage $V_{COM}$ to a level, i.e., $V_{ACOM}$, compatible with the input voltage levels of active filter 20. Active filter 20 outputs a filtered voltage $V_{FIL}$ indicative of the back electromotive force. In response to signals $V_{ABEMF1}$ and $V_{ACOM}$ at inputs 20A and 20B, respectively, active filter 20 generates an output voltage $V_{FIL}$ at output terminal 20C, which is transmitted to the noninverting input of comparator 76.

Comparator 76 compares output voltage $V_{FIL}$ with a reference voltage $V_{REF}$ to generate an output signal $V_{OUT}$ indicative of the motor rotor position. It should be noted that comparator 76 may serve as a zero-cross detection circuit that determines the zero-crossing value of BEMF signal $V_{BEMF2}$.

In a phase commonly referred to as a W-phase, a BEMF signal $V_{BEMF3}$ appears at node 136, whereas BEMF signals $V_{BEMF1}$ and $V_{BEMF2}$ are absent from nodes 132 and 134, respectively. BEMF signal $V_{BEMF3}$ is level shifted or voltage adjusted to a lower voltage level by voltage divider circuit 26 so that a shifted or adjusted voltage $V_{ABEMF3}$ is generated at node 54 and appears at conduction terminal 64B of switch 64. Switch control circuit 70 generates control signals that close switch 64 and open switches 60 and 62. More particularly, switch control circuit 70 generates a control signal at control terminal 64A to close switch 64, a control signal at control terminal 60B to open switch 60, and a control signal at switch 62 to open switch 62. In response to switch 64 being closed, adjusted voltage $V_{ABEMF3}$ appearing at conduction terminal 64B is transmitted to conduction terminal 64C and to inverting input 20A of active filter 20.

Common voltage $V_{COM}$ appearing at node COM is level shifted or voltage adjusted to a lower voltage by voltage divider circuit 18 so that a shifted or adjusted voltage $V_{ACOM}$ is generated at node 86 and appears at conduction terminal 88B of switch 88. Switch control circuit 70 generates a control signal that closes switch 88. In response to switch 88 being closed, adjusted voltage $V_{ACOM}$ appearing at conduction terminal 88B is transmitted to conduction terminal 88C and to noninverting input 20B of active filter 20.

Thus, voltage divider circuit 26 lowers or shifts BEMF voltage $V_{BEMF3}$ to a level, i.e., $V_{ABEMF3}$, compatible with active filter 20. Likewise, voltage divider circuit 18 lowers or shifts voltage $V_{COM}$ to a level, i.e., $V_{ACOM}$, compatible with the input voltage levels of active filter 20. Active filter 20 is configured to output a filtered voltage $V_{FIL}$ indicative of the back electromotive force. In response to signals $V_{ABEMF1}$ and $V_{ACOM}$ at inputs 20A and 20B, respectively, active filter 20 generates an output voltage $V_{FIL}$ at output terminal 20C, which is transmitted to the noninverting input of comparator 76.

Comparator 76 compares output voltage $V_{FIL}$ with a reference voltage $V_{REF}$ to generate an output signal $V_{OUT}$ indicative of the motor rotor position. It should be noted that comparator 76 may serve as a zero-cross detection circuit that determines the zero-crossing value of BEMF signal $V_{BEMF3}$.

Figure 2A:
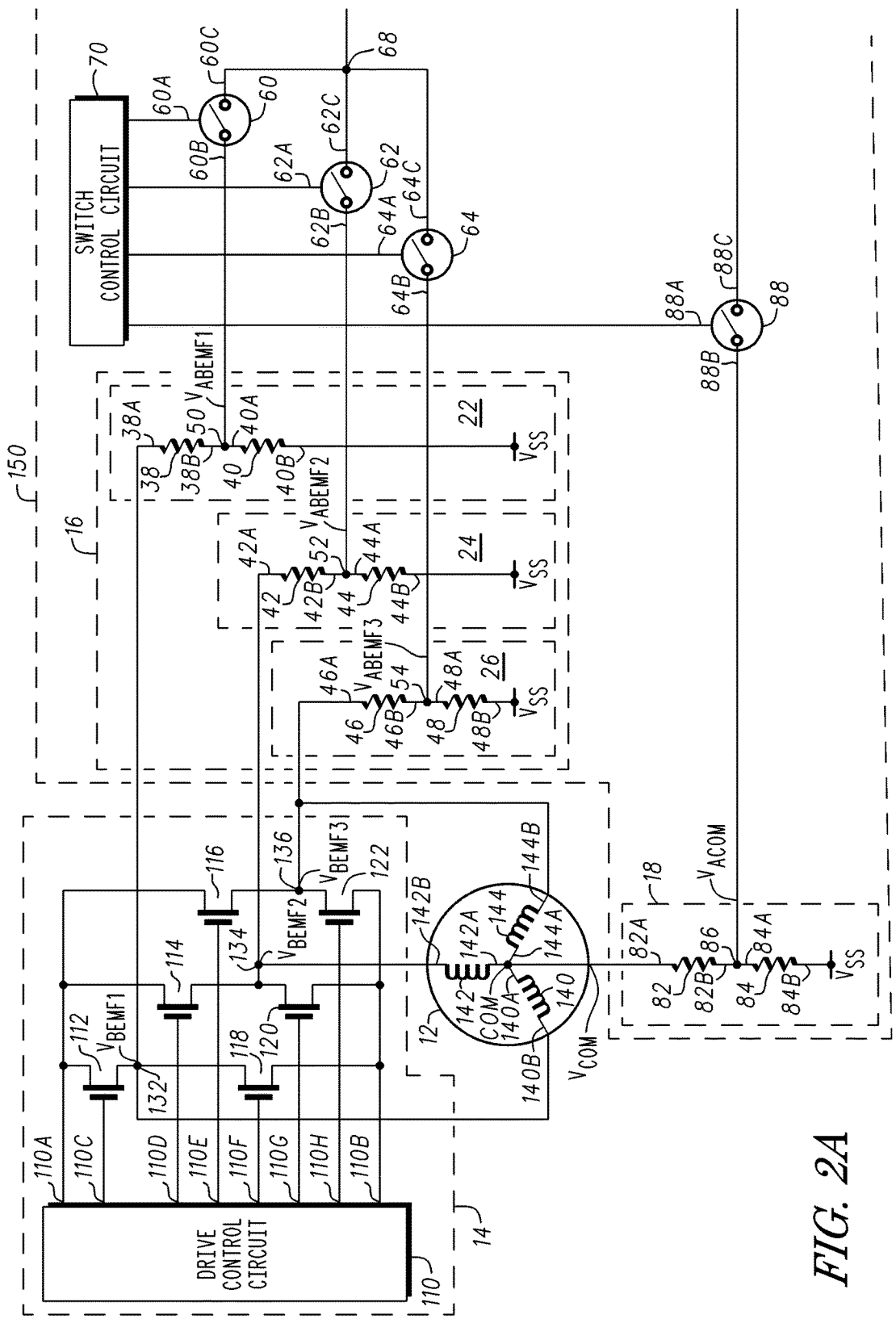
FIG. 2A is a portion of a circuit schematic of a sensor-less detection circuit coupled to a Brushless Direct Current (BLDC) motor and to a motor drive circuit in accordance with another embodiment of the present invention.
Figure 2B:
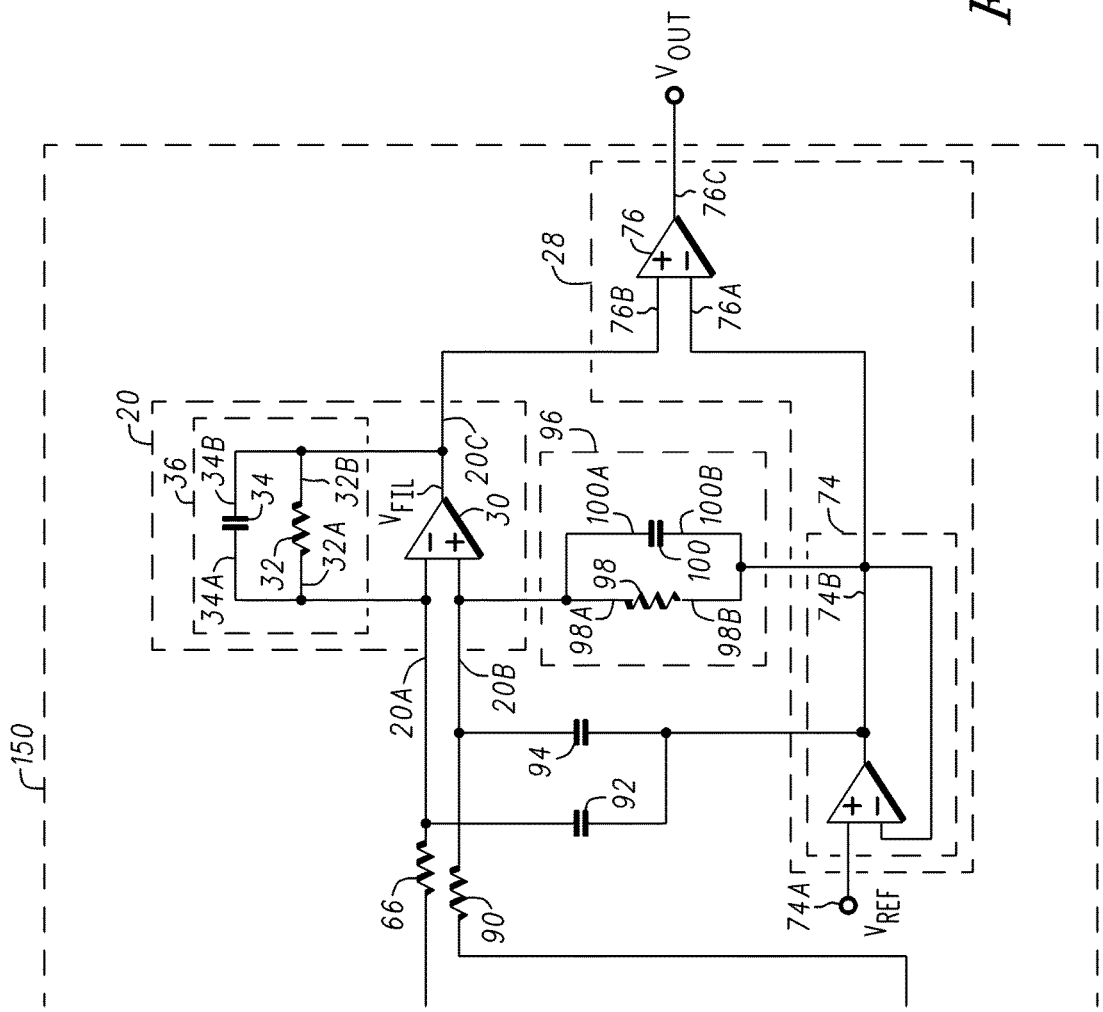
FIG. 2B is another portion of a circuit schematic of a sensor-less detection circuit coupled to a Brushless Direct Current (BLDC) motor and to a motor drive circuit of FIG. 2A.

FIGS. 2A and 2B illustrate a circuit schematic of a sensor-less detection circuit 150 coupled to a Brushless Direct Current (BLDC) motor 12 and to a motor drive circuit 14 in accordance with another embodiment of the present invention. Detection circuit 150 is similar to detection circuit 10 except that capacitor 92 has a terminal connected to inverting input 20A and a terminal connected to a terminal of capacitor 94. The other terminal of capacitor 94 is connected to noninverting input 20B. The terminals of capacitors 92 and 94 that are commonly connected together are connected to output 74B.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A sensor-less detection circuit, comprising:
   a first voltage adjustment circuit having a first terminal and a second terminal, the first terminal of the first voltage adjustment circuit coupled for receiving a first induced voltage, a second induced voltage, or a third induced voltage;
   a second voltage adjustment circuit having a first terminal coupled for receiving a common voltage and a second terminal;
   a differential amplifier having an inverting input terminal, a noninverting input terminal, and an output terminal, the inverting input terminal of the differential amplifier coupled to the second terminal of the first voltage adjustment circuit and the noninverting input terminal of the differential amplifier coupled to the second terminal of the second voltage adjustment circuit;

a comparator having a first input terminal, a second input terminal, and an output terminal, the first input terminal of the comparator coupled to the output terminal of the differential amplifier; and a reference circuit having an output terminal coupled to the second input terminal of the comparator.

2. The sensor-less detection circuit of claim 1, wherein the reference circuit comprises an amplifier configured as a follower circuit having an inverting input terminal, a noninverting input terminal, and an output terminal, the noninverting input terminal of the amplifier configured as a follower circuit and coupled for receiving a reference voltage, the inverting input terminal of the amplifier configured as a follower circuit coupled to the output terminal of the amplifier configured as a follower circuit to form the output terminal of the reference circuit.

3. A sensor-less detection circuit, comprising:
a first voltage adjustment circuit having a first terminal and a second terminal, the first terminal of the first voltage adjustment circuit coupled for receiving a first induced voltage, a second induced voltage, or a third induced voltage;

a second voltage adjustment circuit having a first terminal coupled for receiving a common voltage and a second terminal;

a differential amplifier having an inverting input terminal, a noninverting input terminal, and an output terminal, the inverting input terminal of the differential amplifier coupled to the second terminal of the first voltage adjustment circuit and the noninverting input terminal of the differential amplifier coupled to the second terminal of the second voltage adjustment circuit;

a resistor-capacitor network coupled between the inverting input terminal of the differential amplifier and the output terminal of the differential amplifier; and a comparator having a first input terminal, a second input terminal, and an output terminal, the first input terminal of the comparator coupled to the output terminal of the differential amplifier.

4. The sensor-less detection circuit of claim 3, wherein the resistor-capacitor network is configured as a low pass filter.

5. The sensor-less detection circuit of claim 3, wherein the resistor-capacitor network comprises:
a first resistor having a first terminal and a second terminal; and
first capacitor having a first terminal and a second terminal, wherein the first terminal of the first resistor is commonly coupled to the first terminal of the first capacitor and to the inverting input of the differential amplifier and the second terminal of the first resistor is commonly coupled to the second terminal of the first capacitor and to the output of the differential amplifier.

6. The sensor-less detection circuit of claim 5, wherein the first voltage adjustment circuit comprises:
a second resistor having a first terminal and a second terminal, the first terminal of the second resistor coupled for receiving the first induced voltage;
a third resistor having a first terminal and a second terminal, the first terminal of the third resistor coupled to the second terminal of the second resistor and the second terminal of the third resistor coupled for receiving a first source of operating potential;

a fourth resistor having a first terminal and a second terminal, the first terminal of the fourth resistor coupled for receiving a second induced voltage;
a fifth resistor having a first terminal and a second terminal, the first terminal of the fifth resistor coupled to the second terminal of the fourth resistor and the second terminal of the fifth resistor coupled for receiving the first source of operating potential; and
a sixth resistor having a first terminal and a second terminal, the first terminal of the sixth resistor coupled for receiving a third induced voltage;
a seventh resistor having a first terminal and a second terminal, the first terminal of the seventh resistor coupled to the second terminal of the sixth resistor and the second terminal of the seventh resistor coupled for receiving the first source of operating potential.

7. The sensor-less detection circuit of claim 6, wherein the first terminal of the second resistor is switchably coupled to the inverting input terminal of the differential amplifier, the first terminal of the fourth resistor is switchably coupled to the inverting input terminal of the differential amplifier, and the first terminal of the sixth resistor is switchably coupled to the inverting input terminal of the differential amplifier.

8. The sensor-less detection circuit of claim 6, further including:
a first switch having a control terminal, a first conduction terminal, and a second conduction terminal, the control terminal of the first switch coupled for receiving a first control signal, the first conduction terminal of the first switch coupled to the second terminal of the second resistor and the second terminal of the third resistor, the second conduction terminal of the first switch coupled to the inverting input terminal of the differential amplifier;

a second switch having a control terminal, a first conduction terminal, and a second conduction terminal, the control terminal of the second switch coupled for receiving a second control signal, the first conduction terminal of the second switch coupled to the second terminal of the fourth resistor and the first terminal of the fifth resistor, the second conduction terminal of the second switch coupled to the inverting input terminal of the differential amplifier; and a third switch having a control terminal, a first conduction terminal, and a second conduction terminal, the control terminal of the third switch coupled for receiving a third control signal, the first conduction terminal of the third switch coupled to the second terminal of the sixth resistor and the first terminal of the seventh resistor, the second conduction terminal of the third switch coupled to the inverting input terminal of the differential amplifier.

9. The sensor-less detection circuit of claim 6, wherein the second voltage adjustment circuit comprises:
an eighth resistor having a first terminal and a second terminal, the first terminal of the eighth resistor coupled for receiving the common voltage; and
a ninth resistor having a first terminal and a second terminal, the first terminal of the ninth resistor coupled to the second terminal of the eighth resistor and the second terminal of the ninth resistor coupled for receiving the first source of operating potential.

10. The sensor-less detection circuit of claim 6, further including:
an eighth resistor having a first terminal and a second terminal, the first terminal of the eighth resistor coupled to the second conduction terminal of the first switch, the second conduction terminal of the second switch, and the second conduction terminal of the third switch and the second terminal of the eighth resistor coupled to the inverting input terminal of the differential amplifier;

a second capacitor having a first terminal and a second terminal, the first terminal of the second capacitor coupled to inverting input terminal of the differential amplifier and the second terminal of the second capacitor coupled for receiving the first source of operating potential;

a third capacitor having a first terminal and a second terminal, the first terminal of the third capacitor coupled to noninverting input terminal of the differential amplifier and the second terminal of the third capacitor coupled for receiving the first source of operating potential; and a second resistor-capacitor filter having a first terminal and a second terminal, the first terminal of the second resistor-capacitor filter coupled to the inverting input of the differential amplifier and the second terminal of the second resistor-capacitor filter coupled to the output terminal of the amplifier configured as a follower circuit.

11. A sensor-less circuit configured to detect a position of a motor rotor, comprising:
an active filter having a differential input and an output, the differential input including an inverting input terminal and a noninverting input terminal;
a first level shifting circuit having a first terminal and a second terminal, the first terminal coupled for receiving a first back electromotive force voltage and the second terminal switchably coupled to the inverting input terminal of the active filter;
a second level shifting circuit having a first terminal and a second terminal, the first terminal coupled for receiving a common voltage and the second terminal switchably coupled to the noninverting input terminal of the active filter; and
a determination circuit having a first input terminal, a second input terminal, and an output terminal, the first input terminal coupled to the output of the active filter.

12. The sensor-less circuit of claim 11, wherein the active filter comprises:
a differential amplifier having a first input, a second input, and an output the first input serving as the inverting input terminal of the active filter, the second input serving as the noninverting input terminal of the active filter, and the output serving as the output of the active filter;
a first capacitor having a first terminal and a second terminal, the first terminal of the capacitor coupled to the first input of the differential amplifier and the second terminal of the capacitor coupled to the output of the differential amplifier; and
a first resistor having a first terminal and a second terminal, the first terminal of the first resistor coupled to the first input of the differential amplifier and the second terminal of the first resistor coupled to the output of the differential amplifier.

13. The sensor-less circuit of claim 12, wherein the determination circuit comprises:
a comparator having a first input terminal and a second input terminal, the first input terminal coupled to the output of the differential amplifier;
a voltage follower circuit having a first input terminal, a second input terminal, and an output terminal, the first input terminal of the voltage follower circuit coupled to the output terminal of the voltage follower circuit and to the second input terminal of the comparator and the second input terminal of the voltage follower circuit coupled for receiving a reference voltage.

14. The sensor-less circuit of claim 12, wherein the first level shifting circuit comprises:
a first voltage divider network having a first terminal and a first node, the first node switchably coupled to the inverting input terminal of the differential amplifier and the first terminal coupled for receiving a first back electromotive force;
a second voltage divider network having a first terminal and a first node, the first node of the second voltage divider network switchably coupled to the inverting input terminal of the differential amplifier and the first terminal of the second voltage divider network coupled for receiving a second back electromotive force; and
a third voltage divider network having a first terminal and a first node, the first node of the third voltage divider network switchably coupled to the inverting input terminal of the differential amplifier and the first terminal of the third voltage divider network coupled for receiving a third back electromotive force; and wherein the second level shifting circuit comprises a third voltage divider network having a first terminal and a first node, the first node of the third voltage divider network coupled to the noninverting input terminal of the differential amplifier and the first terminal of the third voltage divider network coupled for receiving the common voltage.

15. The sensor-less circuit of claim 14, wherein the first node of the third voltage divider network is switchably coupled to the noninverting input terminal of the differential amplifier.

16. A method for detecting a motor rotor position, comprising:
receiving a first back electromotive force, the first back electromotive force at a first voltage level;
shifting the first back electromotive force from the first voltage level to a second voltage level;
filtering the first back electromotive force at the second voltage level to generate a first filtered voltage; and
generating a first motor rotor position signal in response to comparing the first filtered voltage with a reference voltage.

17. The method of claim 16, further including:
receiving a second back electromotive force, the second back electromotive force at a third voltage level;
shifting the second back electromotive force from the third voltage level to a fourth voltage level;
filtering the second back electromotive force at the fourth voltage level to generate a second filtered voltage;
generating a second motor rotor position signal in response to comparing the second filtered voltage with the reference voltage;
receiving a third back electromotive force, the third back electromotive force at a fifth voltage level;
shifting the third back electromotive force from the fifth voltage level to a sixth voltage level;
filtering the third back electromotive force at the fifth voltage level to generate a third filtered voltage; and
generating a third motor rotor position signal in response to comparing the third filtered voltage with the reference voltage.

18. The method of claim 17, wherein the second voltage level is less than the first voltage level, the fourth voltage level is less than the third voltage level, and the sixth voltage level is less than the fifth voltage level.

19. The method of claim 16, wherein filtering the first back electromotive force at the second voltage level to generate the first filtered voltage includes switchably coupling the first back electromotive force at the second voltage level to an active low pass filter;

filtering the second back electromotive force at the fourth voltage level to generate the second filtered voltage includes switchably coupling the second back electromotive force at the fourth level to the active low pass filter; and filtering the third back electromotive force at the sixth voltage level to generate the third filtered voltage includes switchably coupling the third back electromotive force at the sixth level to the active low pass filter.

* * * * *